United States Patent
Vasistha et al.

(10) Patent No.: US 10,379,599 B2
(45) Date of Patent: Aug. 13, 2019

(54) METHOD FOR DISPLAYING ITEMS IN AN ELECTRONIC DEVICE WHEN THE DISPLAY SCREEN IS OFF

(71) Applicant: Samsung Electronics Co., Ltd., Suwon-si, Gyeonggi-do (KR)

(72) Inventors: Daksh Kumar Vasistha, Kota (IN); Ashish Kak, Bangalore (IN); Vijay Kumar Mishra, Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/806,146

(22) Filed: Jul. 22, 2015

(65) Prior Publication Data

US 2016/0026236 A1    Jan. 28, 2016

(30) Foreign Application Priority Data

Jul. 24, 2014  (IN) ............................ 3620/CHE/2014

(51) Int. Cl.

| | |
|---|---|
| *G06F 1/00* | (2006.01) |
| *G06F 1/32* | (2019.01) |
| *G06F 1/3296* | (2019.01) |
| *G06F 1/3215* | (2019.01) |
| *G06F 1/3234* | (2019.01) |
| *G06F 1/3293* | (2019.01) |
| *G06F 3/0488* | (2013.01) |

(52) U.S. Cl.
CPC .......... *G06F 1/3296* (2013.01); *G06F 1/3215* (2013.01); *G06F 1/3262* (2013.01); *G06F 1/3265* (2013.01); *G06F 1/3293* (2013.01); *G06F 3/04883* (2013.01); *Y02D 10/122* (2018.01); *Y02D 10/153* (2018.01); *Y02D 50/20* (2018.01)

(58) Field of Classification Search
CPC .......................................................... G06F 1/32
See application file for complete search history.

(56) References Cited

U.S. PATENT DOCUMENTS

| | | | |
|---|---|---|---|
| 2010/0302028 A1* | 12/2010 | Desai ................ | H04W 52/0258 340/539.3 |
| 2010/0306718 A1 | 12/2010 | Shim et al. | |
| 2012/0084651 A1* | 4/2012 | Miller ................ | G06F 3/04883 715/716 |
| 2013/0097668 A1* | 4/2013 | Park ..................... | G06F 21/31 726/2 |
| 2013/0106742 A1* | 5/2013 | Lee ..................... | G06F 3/0484 345/173 |
| 2013/0157646 A1* | 6/2013 | Ferren ................ | G06F 1/3265 455/418 |

(Continued)

*Primary Examiner* — Mohammed H Rehman
(74) *Attorney, Agent, or Firm* — Jefferson IP Law, LLP

(57) ABSTRACT

A method for controlling display of at least one item in an electronic device is provided. The method includes, while a display screen of the electronic device is in an off state, detecting a gesture performed on a portion of the display screen using a low power controller and controlling, by the low power controller, to display the one or more items on the display screen in response to the detecting of the gesture. The one or more items are displayed in part of the portion of the display screen of the electronic device.

15 Claims, 12 Drawing Sheets

(56) References Cited

U.S. PATENT DOCUMENTS

| | | | |
|---|---|---|---|
| 2013/0187869 A1 | 7/2013 | Rydenhag et al. | |
| 2013/0205210 A1* | 8/2013 | Jeon | G06F 3/04883 715/716 |
| 2014/0113268 A1* | 4/2014 | Dhasmana | G06Q 10/1091 434/365 |
| 2014/0184526 A1* | 7/2014 | Cho | G06F 3/041 345/173 |
| 2014/0232834 A1* | 8/2014 | Sato | G02B 27/225 348/51 |
| 2014/0298172 A1* | 10/2014 | Choi | G06F 3/0488 715/716 |
| 2014/0300542 A1* | 10/2014 | Jakubiak | G06F 3/017 345/157 |
| 2014/0325443 A1* | 10/2014 | Kim | G06F 3/0482 715/825 |
| 2014/0333551 A1* | 11/2014 | Kim | G06F 3/0485 345/173 |
| 2014/0351761 A1* | 11/2014 | Bae | G06F 3/04817 715/835 |
| 2014/0354605 A1* | 12/2014 | Kurita | G06F 3/03545 345/179 |
| 2015/0022098 A1* | 1/2015 | Knapp | G09G 3/2003 315/161 |
| 2015/0153948 A1* | 6/2015 | Bocking | G06F 3/017 715/802 |
| 2015/0268826 A1* | 9/2015 | Langholz | G06F 3/04845 715/752 |
| 2015/0355715 A1* | 12/2015 | Smith | G06F 3/017 715/863 |
| 2015/0365306 A1* | 12/2015 | Chaudhri | G06F 3/0416 715/736 |
| 2016/0026560 A1* | 1/2016 | Jackson | H04L 41/0253 714/38.1 |
| 2016/0062636 A1* | 3/2016 | Jung | G06F 3/04883 715/762 |
| 2016/0085359 A1* | 3/2016 | Park | G06F 3/042 345/174 |

* cited by examiner

METHOD FOR DISPLAYING ITEMS IN AN ELECTRONIC DEVICE WHEN THE DISPLAY SCREEN IS OFF

CROSS-REFERENCE TO RELATED APPLICATION(S)

This application claims the benefit under 35 U.S.C. § 119(a) of an Indian patent application filed on Jul. 24, 2014 in the Indian Patent Office and assigned Serial number 3620/CHE/2014, the entire disclosure of which is hereby incorporated by reference.

TECHNICAL FIELD

The present disclosure relates to user interaction with an electronic device. More particularly, the present disclosure relates to a method for controlling display of one or more items in the electronic device while a display screen of the electronic device is off.

BACKGROUND

Modern electronic devices (for example, mobile devices or smart phones) provide additional functionality including telephony, contacts, games, photos, and network connectivity (e.g., Internet web browser, email, and location based services). Mobile devices generally include lock screens to prevent unauthorized or unintentional access to the device. These mobile devices enable a user to define a touch pattern gesture to unlock a touch screen. In order to unlock the mobile device, the user performs the touch gesture for unlocking the touch screen. Further, if the user intends to check the notifications on the mobile device, the user unlocks the mobile device.

In the existing system, in order to check frequent notifications or to access frequently used applications on the mobile devices, each time the user unlocks the display screen of the electronic device by performing a touch gesture on the mobile device. Further, the user wakes up the mobile device out from the sleep state to check the frequent notifications or to access frequently used applications. An application processor of the mobile device wakes up to provide the notifications or the frequently used applications to the user. Generally, when the application processor wakes up, the application processor boots up many resources which are needed to provide many other services, than checking notifications or frequent applications. These additional resources are not needed by the user when only notification checking is being performed. Since these additional resources are also booted up by the application processor, this results in higher power consumption. Additionally, the application processor itself consumes more power for providing notifications or the frequently used applications to the user. In the existing system, even though there is no need for completely illuminating the display screen, the mobile devices provide the notifications and other frequently used applications to the user by completely illuminating the display screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for controlling display of one or more items in an electronic device while a display screen of the electronic device is off.

Another aspect of the present disclosure is to provide a method and device for displaying one or more items on the display screen using a low power controller without waking an application processor of the electronic device.

Another aspect of the present disclosure is to provide a method for displaying one or more items in the electronic device with minimal user interaction while the display screen of the electronic device is off.

In accordance with an aspect of the present disclosure, a method for controlling display of at least one item in an electronic device is provided. The method includes, while a display screen of the electronic device is in an off state, detecting a gesture performed on a portion of the display screen using a low power controller. Further, the method includes controlling, by the low power controller, to display the at least one item on the display screen in response to the detecting of the gesture, wherein the at least one item is displayed at least in part of the portion of the display screen.

In accordance with another aspect of the present disclosure, an electronic device for controlling display of at least one item is provided. The electronic device includes a display screen and a low power controller. The low power controller is configured to detect a gesture performed on a portion of the display screen, while the display screen of the electronic device is in an off state. Further, the low power controller is configured to control to display the at least one item on the display screen in response to detecting the gesture, wherein the at least one item is displayed at least in part of the portion of the display screen.

In accordance with another aspect of the present disclosure, a computer program product is provided. The computer program product includes a computer executable program code recorded on a non-transitory computer readable non-transitory storage medium, the computer executable program code when executed causing the operations including detecting a gesture performed on a portion of a display screen using a low power controller, while a display screen of the electronic device is in an off state. Further, the computer program product is configured to control, by the low power controller, to display the at least one item on the display screen in response to the detecting of the gesture, wherein the at least one item is displayed at least in part of the portion of the display screen.

In accordance with yet another aspect of the present disclosure, an electronic device for controlling display of at least one item is provided. The electronic device includes a display screen and a controller configured to detect a gesture performed on a portion of the display screen, to identify at least one item corresponding to the gesture, and to display the identified at least one item at least part in the portion of the display screen based on the size of the detected gesture.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
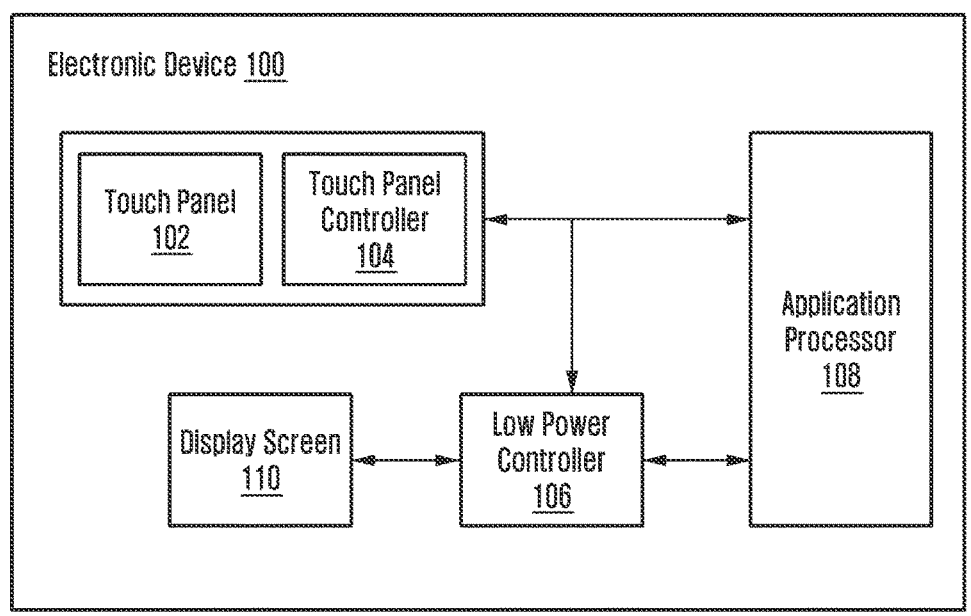
FIGS. 1A, 1B, and 1C illustrate an electronic device with a low power controller for displaying one or more items without waking an application processor according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein achieve a method for controlling display of one or more items on an electronic device when the display screen of the electronic device is off. The electronic device is provided with a low power controller with a cache memory that is used for storing user defined gestures and the corresponding notifications for the user defined gestures. In an example, the electronic device can be a mobile phone, a personal digital assistant (PDA), a smart phone, a tablet, a personal computer or a portable device or any other communication device. The method described herein displays the one or more items on the display screen of the electronic device without waking an application processor (AP) of the electronic device.

Initially, when a new item or a notification is received by the electronic device, the AP of the electronic device wakes up from sleep state and processes the notification or the message. Further, the AP sends the processed notification or the message to the low power controller and the AP goes back to the sleep state. When the user performs a touch input gesture corresponding to the notification (as defined or configured by the user), the electronic device displays the corresponding notification on the display screen without waking the application processor.

In an embodiment of the present disclosure, the display area on which the notifications or the items or the messages displayed to the user can be configurable as required by the user. In an embodiment of the present disclosure, the touch input gesture for obtaining the notification or items or messages from the low power controller can be configurable by the user. According to an embodiment of the present disclosure, the one or more items displayed to the user on the display screen of the electronic device based on the dimensions of the touch input gesture performed by the user.

Unlike systems of the related art, the method disclosed herein can display the one or more items or notifications to the user without waking the application processor of the electronic device, thereby reducing battery power consumption of the electronic device. Further, the one or more items or notifications or messages can be displayed to the user without completely illuminating the display screen of the electronic device.

Referring now to the drawings and more particularly to FIGS. 1A to 8 where similar reference characters denote corresponding features consistently throughout the figures, there are shown preferred embodiments of the present disclosure.

Figure 1B:
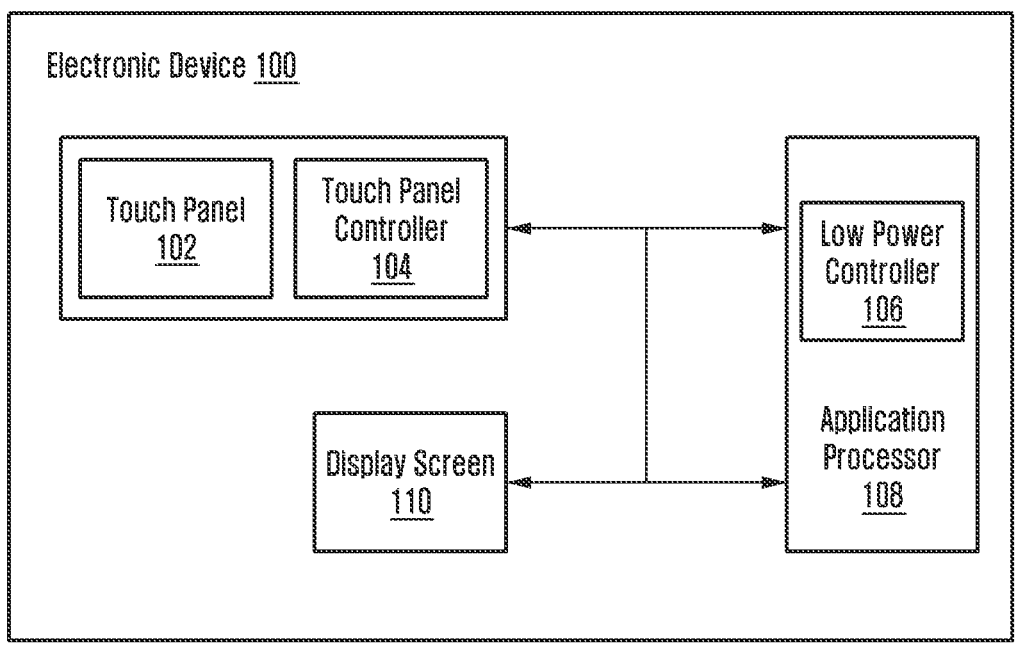
Figure 1C:
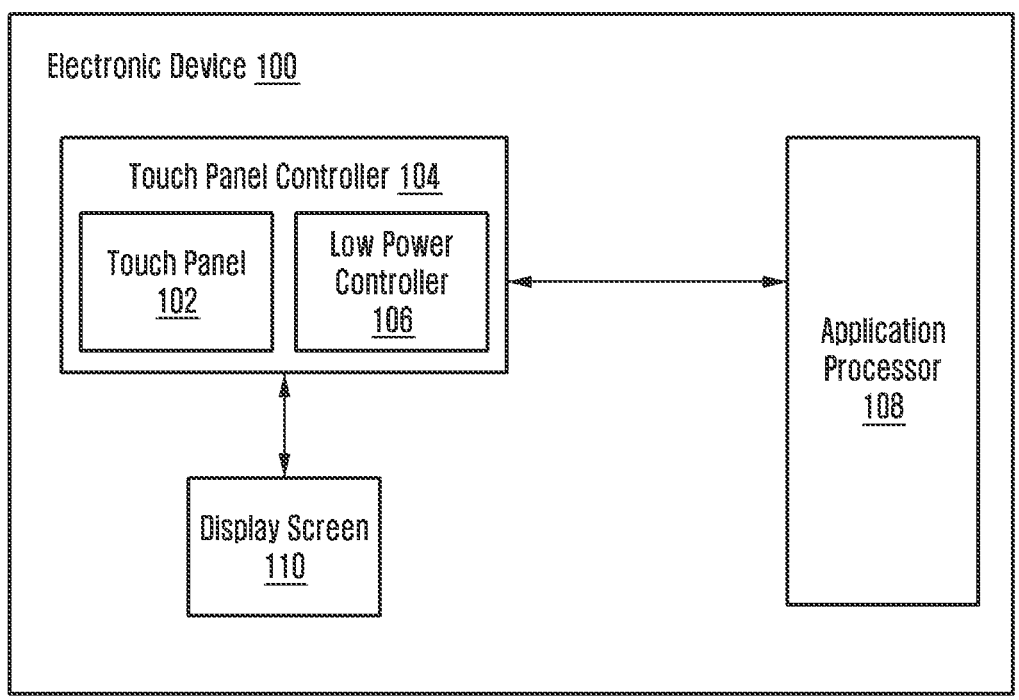

FIGS. 1A, 1B, and 1C illustrate an electronic device with a low power controller for displaying one or more items without waking the application processor according to various embodiments of the present disclosure.

Referring to FIG. 1A, the electronic device 100 includes a touch panel 102, a touch panel controller 104, a low power controller 106, an AP 108 and a display screen 110. The touch panel 102 receives a touch input gesture from the user. Further, the touch input gesture received by the touch panel 102 is processed by the touch panel controller 104. The touch panel controller 104 identifies the touch input gesture by processing the touch input gesture received from the touch panel 102.

In an embodiment of the present disclosure, the touch panel controller 104 sends the touch input gesture to the low power controller 106 without waking the AP 108 for processing the touch input gesture. The low power controller acts as an intermediate entity in between the touch panel controller 104 and the AP 108. In an embodiment of the present disclosure, the low power controller 106 contains a cache memory which is used for storing the user defined gestures and various application notifications. The cache memory of the low power controller 106 also stores the instructions of the AP 108 for performing one or more actions without waking the AP 108.

The low power controller 106 receives the touch input gesture from the touch panel controller 104 and the low power controller 106 identifies one or more items (for example, any notifications from applications, any messages received by the electronic device) corresponding to the touch input gesture performed on the display screen of the electronic device. When the one or more items corresponding to the touch input gesture are identified, the low power controller 106 sends the one or more items to the display screen 110 of the electronic device 100.

The method for displaying one or more items on the display screen of the electronic device without waking the AP 108 is as described herein. Initially, when a new notification is received by the electronic device 100, the AP 108 wakes up from the sleep state for processing the received notification. For example, when the electronic device 100 receives the new notification, the AP 108 identifies the type of notification received by the electronic device 100. In an example, the AP 108 may identify the new notification as a new message, an update from a social networking site (SNS) or a notification from various applications on the electronic device 100. Thus, the AP 108 processes the notifications received by the electronic device 100 and sends these notifications to the low power controller 106. Further, the low power controller 106 receives the notifications and stores these notifications in the cache memory of the low power controller 106.

Further, the low power controller 106 stores the notifications and the corresponding user defined gestures for displaying the notifications. In an embodiment of the present disclosure, the notifications received from the AP 108 and the user defined gestures are mapped at the low power controller for providing the notifications corresponding to the touch input gesture performed by the user.

In an embodiment of the present disclosure, the low power controller 106 maintains a mapping module (shown in FIG. 2) in which the notifications and the corresponding user defined gestures are mapped accordingly for displaying one or more items (notifications or updates) to the user based on the touch input gesture performed on the display screen 110.

In an embodiment of the present disclosure, the low power controller 106 can be an ultra low power sensor which can handle the touch input gesture performed by the user and sends the corresponding items or notifications, in response to the touch input gesture to the display screen 110. In an embodiment of the present disclosure, the AP 108 can provide the functionality of the low power controller 106, where the low power controller 106 is integrated with the AP 108 as shown in FIG. 1B for controlling display of one or more items corresponding to the touch input gesture performed on the display screen of the electronic device 100.

In an embodiment of the present disclosure, the low power controller can be integrated with the touch panel controller 104 as shown in FIG. 1C for controlling display of one or more items corresponding to the touch input gesture performed on the display screen of the electronic device 100.

Figure 2:
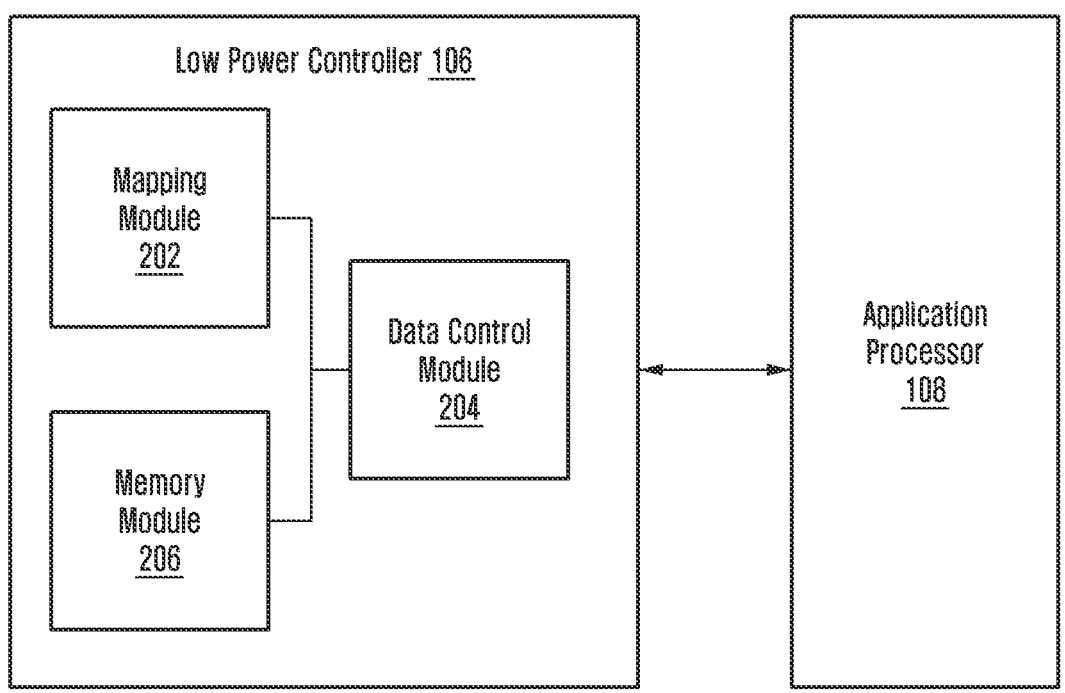
FIG. 2 illustrates a block diagram of the low power controller with various modules according to an embodiment of the present disclosure.

FIG. 2 illustrates a block diagram of the low power controller with various modules according to an embodiment of the present disclosure.

Referring to FIG. 2, the low power controller 106 includes a mapping module 202, a data control module 204 and a memory module 206. The mapping module 202 performs mapping of one or more items with the user defined gestures. In an example, the mapping module 202 maps the user defined gesture, for example the alphabet 'N' with all the notifications that are received in the electronic device. In the above example, the alphabet 'N' is mapped with all the notifications received in the electronic device. Thus, when the user performs the touch input gesture as 'N', the mapping module 202 determines that the user is requesting the notifications, since the touch input gesture (alphabet 'N') performed by the user is mapped with all the notifications at the mapping module 202.

The data control module 204 receives the data from the AP 108. The data can include, but is not limited to, notifications, messages, multimedia items, updates from SNSs, call related information such as missed calls or the like. In an embodiment of the present disclosure, the AP 108 sends the data to the low power controller 106 thorough the data control module 204.

The memory module 206 in the low power controller 106 may include a random access memory (RAM) or another type of dynamic storage device that may store information and instructions, for example an application, for execution by processor, a read-only memory (ROM) device or another type of static storage device. In an embodiment of the present disclosure, the memory module 206 stores one or more items (such as the notifications) and the user defined gestures corresponding to the one or more items.

In an embodiment of the present disclosure, when the data is received from the AP 108, the data control module 204 sends the received data to the mapping module 202. The mapping module 202 performs mapping of the received data with the user defined gestures. In an example, the mapping module 202 performs mapping of the notifications with the alphabet 'N' (as defined or configured by the user). In another example, the mapping module 202 performs mapping of the updates from social networks with the alphabet 'S' (as defined or configured by the user).

Figure 3:
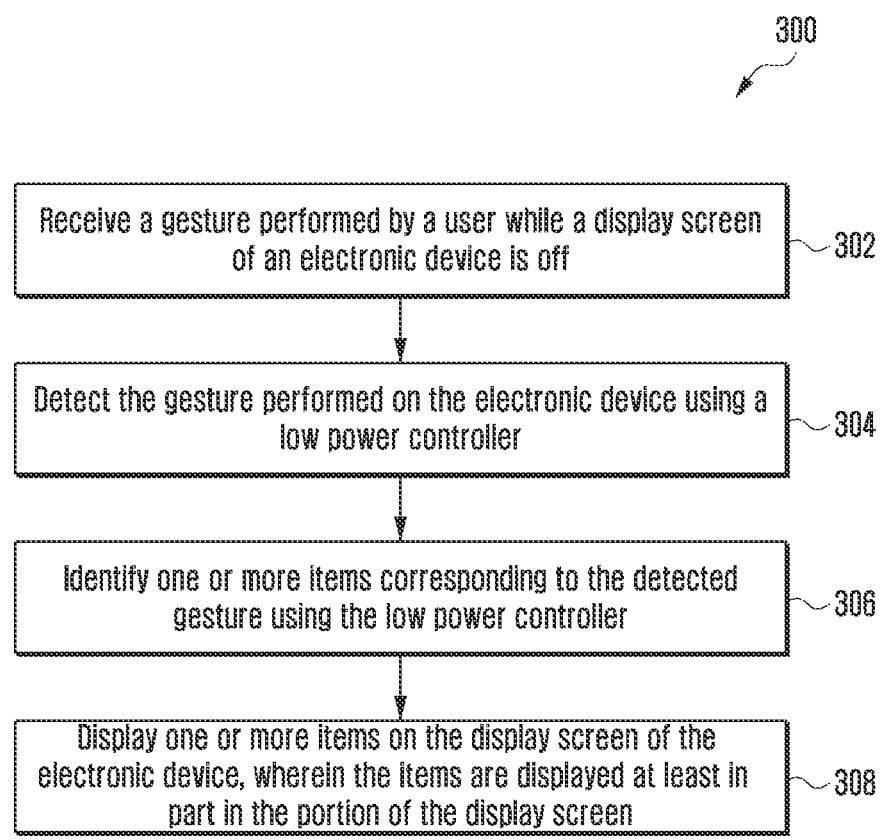
FIG. 3 is a flow diagram illustrating a method for controlling displaying one or more items in the electronic device using the lower power controller without waking the application processor of the electronic device according to an embodiment of the present disclosure.

FIG. 3 is a flow diagram illustrating a method 300 for controlling displaying one or more items in the electronic device using the lower power controller without waking the application processor of the electronic device according to an embodiment of the present disclosure.

Referring to FIG. 3, at operation 302, the method 300 includes receiving a gesture performed by the user, while the display screen of the electronic device is off. In an example, the user performs the touch input gesture (for example the alphabet 'z') on a portion of the display screen of the electronic device, when the display screen of the electronic device is off. At operation 304, the method 300 includes detecting the gesture performed on the electronic device 100 using the low power controller 106. In an embodiment of the present disclosure, the low power controller 106 detects the touch input gesture (alphabet 'Z') gesture by receiving the touch input gesture through the touch panel controller 104.

At operation 306, the method 300 includes identifying one or more items corresponding to the detected gesture using the low power controller 106. In an embodiment of the present disclosure, the low power controller 106 identifies the one or more items corresponding to the detected gesture through the mapping module 202, where each user defined touch input gesture is mapped with the one or more items. In an example, the low power controller 106 identifies the one or more items corresponding to the identified gesture 'Z'. If the low power controller 106 identifies that there are some messages from ZAK (in this example, ZAK refers to a friend of the user, since 'Z' is mapped with messages from ZAK as defined or configured by the user).

At operation 308, the method 300 includes displaying one or more items on the display screen 110 of the electronic device 100. In an example, the low power controller 106 sends the messages from ZAK to the display screen 110 to display the messages to the user. In an embodiment of the present disclosure, the one or more items are displayed at least in part in the portion of the display screen 110. In an example, the one or more items (the messages received from ZAK) are displayed to the user in a small portion on the display screen 110 without completely illuminating the display screen 110. In an embodiment of the present disclosure, the small portion on the display screen on which the notifications or the items or the messages displayed to the user can be configurable as required by the user. In an embodiment of the present disclosure, the one or more items are displayed to the user on the display screen of the electronic device based on the dimensions of the touch input gesture performed by the user. In an example, if the touch input gesture 'Z' performed by the user has larger dimensions, then the messages received from ZAK are displayed to the user corresponding to the larger dimensions of the touch input gesture 'Z'.

Further, the various actions, units, operations, blocks, or acts described in the method 300 can be performed in the order presented, in a different order, simultaneously, or a combination thereof. Furthermore, in some embodiments of the present disclosure, some of the actions, units, operations, blocks, or acts listed in FIG. 3 may be omitted.

Figure 4:
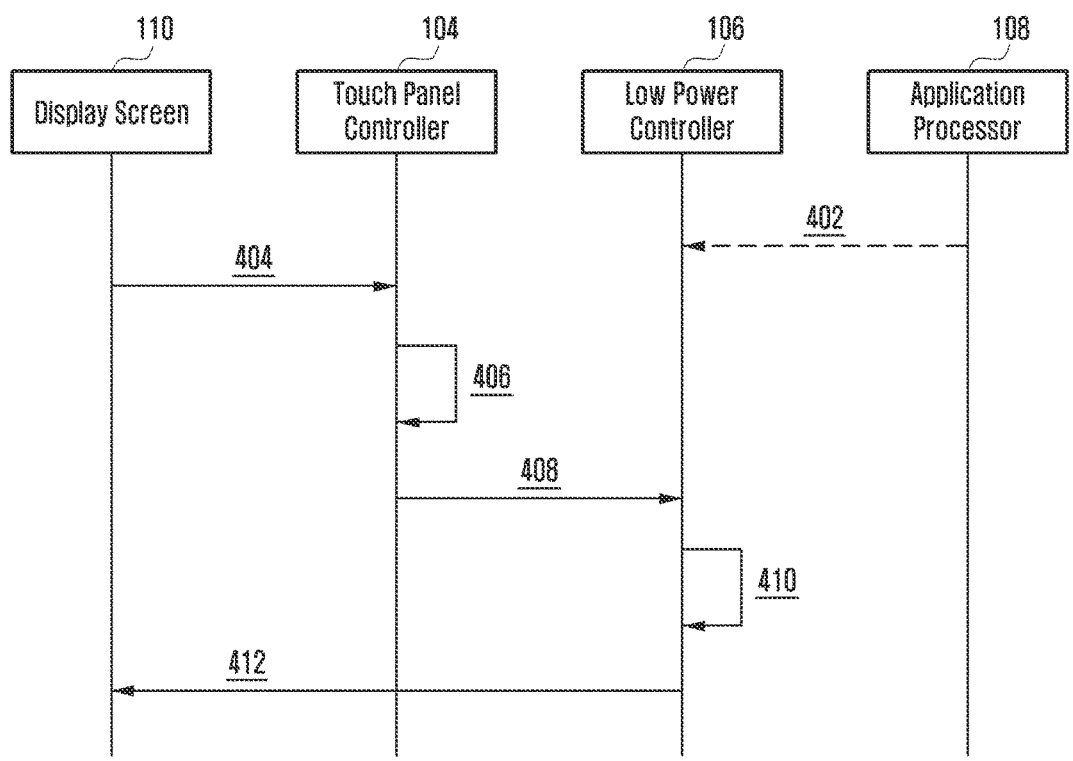
FIG. 4 is a sequence diagram in which one or more items are displayed on the display screen of the electronic device using the low power controller according to an embodiment of the present disclosure.

FIG. 4 is a sequence diagram in which one or more items are displayed on the display screen of the electronic device using the low power controller according to an embodiment of the present disclosure.

Referring to FIG. 4, as depicted in the sequence diagram, at operation 402, initially the AP 108 sends the data which includes the notifications, updates from social networks, multimedia items and other messages to the low power controller 106. In an embodiment of the present disclosure, the AP 108 sends the data to the low power controller through the data control module 204. The data received from the AP 108 is sent to the mapping module 202 where the one or more items (present in the data) are mapped with the touch input gestures as defined or configured by the user. Further, the one or more items mapped with corresponding touch input gestures (as defined or configured by the user) is stored in the memory module 206.

Further, when the user intends to see any notifications received on the electronic device 100, the user performs a predefined touch input gesture, which has been mapped with one or more items corresponding to the touch input gesture by the mapping module 202. The display screen 110 receives the touch input gesture performed by the user. Further, at operation 404, the display screen 110 sends the touch input gesture to the touch panel controller. The touch panel controller 104 receives the touch input gesture from the display screen 110 and, at operation 406, recognizes the touch input gesture to identify the touch input gesture. In an example, when the touch input gesture performed by the user is 'Z', then the touch input controller recognizes the touch input gesture as 'Z'. When the touch input gesture is recognized by the touch panel controller 104, at operation 408, the touch panel controller 104 sends the touch input gesture for processing by the low power controller 106. In an embodiment of the present disclosure, the low power controller 106 receives the touch input gesture and, at operation 410, identifies the one or more items corresponding to the touch input in the memory module 206. In an example, the low power controller 106 identifies whether there are any items associated with the touch input gesture (alphabet 'Z', as in the above example) in the memory module 202. If there are any items mapped with the touch input gesture ('Z'), then, at operation 412, the low power controller 106 sends the one or more items (corresponding to the touch input gesture) to the display screen. In an example, if the low power controller 106 identifies that there are some messages from ZAK (in this example, ZAK refers to a friend of the user, since 'Z' is mapped with messages from ZAK as defined or configured by the user), then the low power controller 106 sends the messages from ZAK to the display screen 110 to display the messages to the user.

Figure 5A:
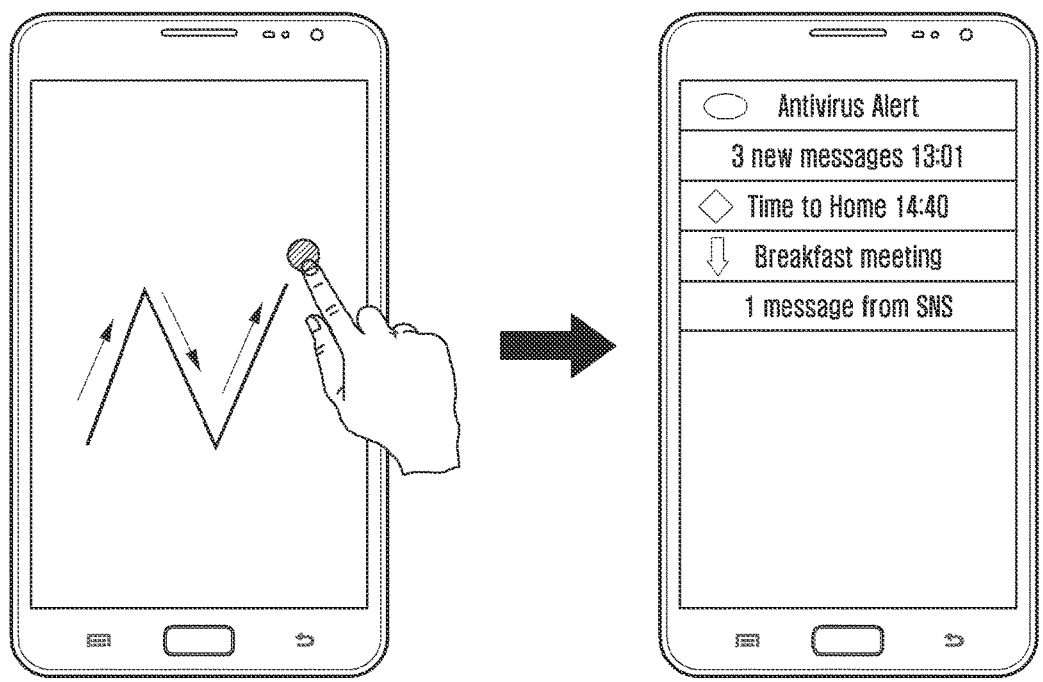
FIGS. 5A and 5B show example illustrations in which the electronic device displays the notifications using the low power controller corresponding to the gesture performed by the user according to various embodiments of the present disclosure.
Figure 5B:
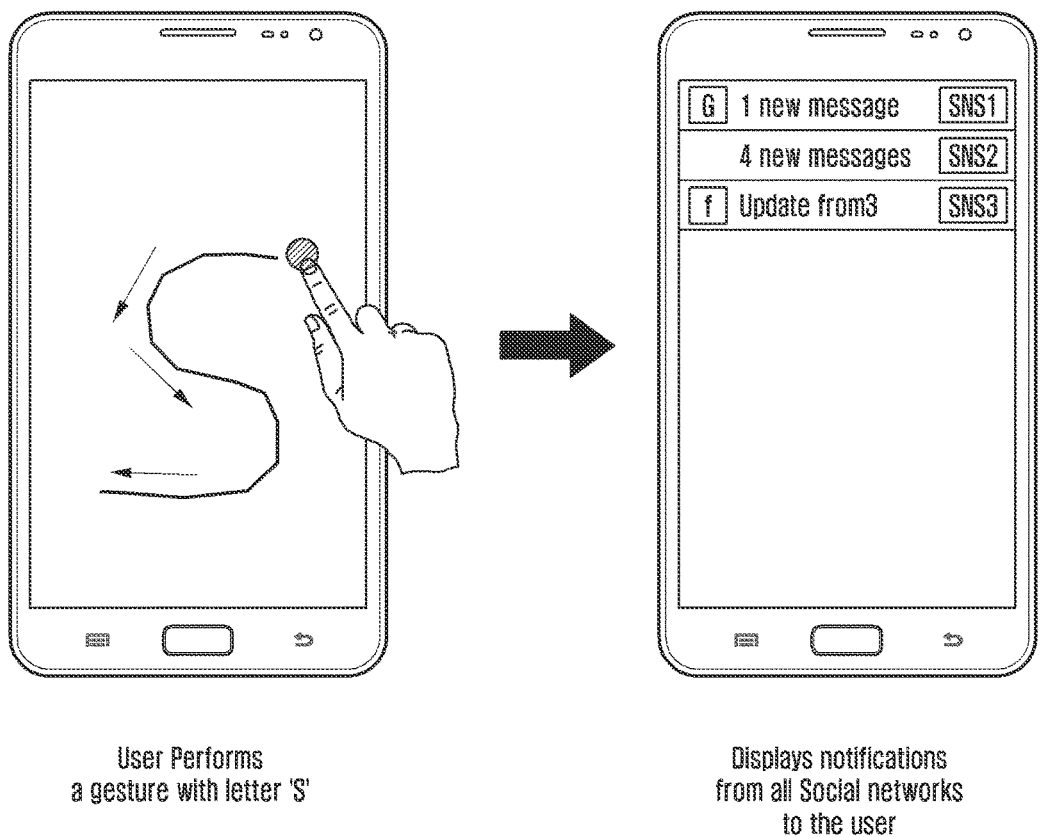

FIGS. 5A and 5B show example illustrations in which the electronic device displays the notifications using the low power controller corresponding to the gesture performed by the user according to various embodiments of the present disclosure.

Referring to FIG. 5A, when the user performs the touch input gesture as alphabet 'N' as shown in the figure, the electronic device displays all the notifications to the user on the display screen 110, without completely illuminating the display screen 110. The touch input gesture 'N' performed by the user is recognized by the touch panel controller 104. Further, the touch panel controller 104 sends the touch input gesture for processing by the low power controller 106. In an embodiment of the present disclosure, the low power controller 106 receives the touch input gesture and identifies the one or more items corresponding to the touch input 'N' in the memory module 206. The mapping module 202 identifies the one or more items corresponding to the touch input gesture 'N'. The one or more items corresponding to the touch input 'N' is obtained from the memory module 'N' in the low power controller 106. The one or more items (the notifications) are displayed to the user in a small portion on the display screen 110 without completely illuminating the display screen 110. In an embodiment of the present disclosure, the display area in which the one or more items or the notifications that are displayed to the user can be configurable by the user.

Referring to FIG. 5B, when the user performs the touch input gesture with alphabet as 'S', then the electronic device 100 displays the notifications that are received from various SNSs.

In FIG. 5B, the electronic device 100 displays that one new message is received from SNS1, four new messages from SNS2 and an update message from SNS3. Initially, the touch input gesture 'S' performed by the user is recognized by the touch panel controller 104. Further, the touch panel controller 104 sends the touch input gesture 'S' for processing by the low power controller 106. In an embodiment of the present disclosure, the low power controller 106 receives the touch input gesture 'S' and identifies the one or more items corresponding to the touch input 'S' in the memory module 206. The mapping module 202 identifies that touch input gesture 'S' is associated with messages or updates from various SNSs of the user. The messages from various SNSs of the user corresponding to the touch input 'S' is obtained from the memory module 206 in the low power controller 106 and are displayed on the display screen 110 of the electronic device 100. The messages from various SNSs of the user are displayed to the user in a small portion on the display screen 110 without completely illuminating the display screen 110. Thus, the electronic device 100 displays the messages or notifications that are received from various SNSs, when the user performs touch input gesture 'S' as shown in FIG. 5B.

Figure 6A:
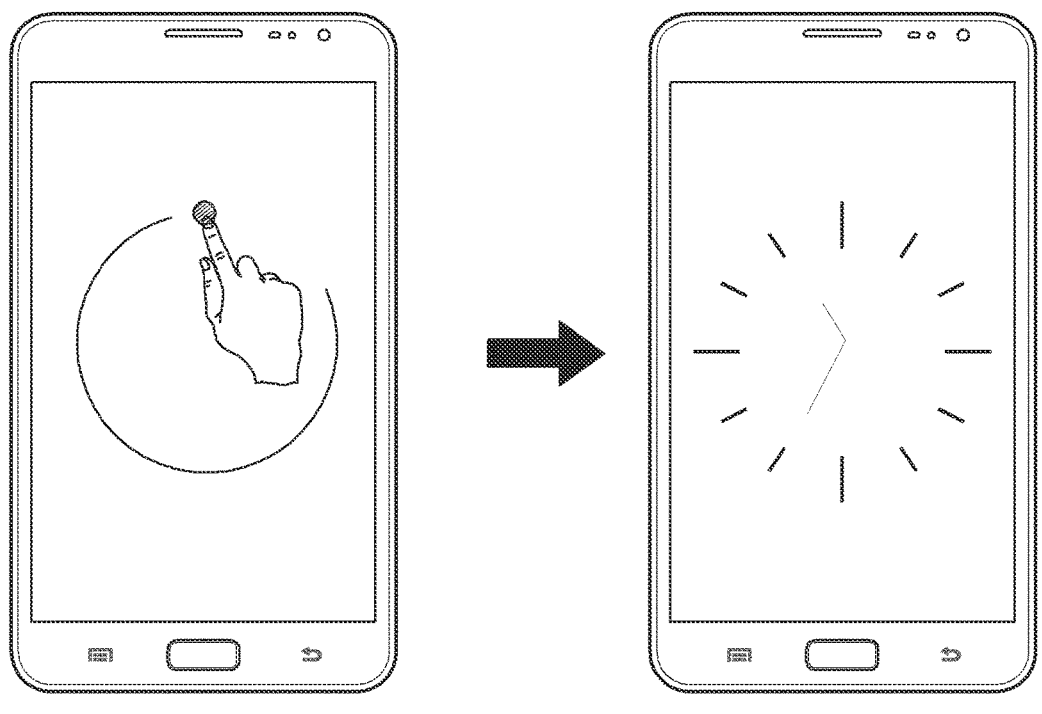
FIGS. 6A and 6B show example illustrations in which the electronic device displays the clock and calendar application using the low power controller based on the gesture performed by the user according to various embodiments of the present disclosure.
Figure 6B:
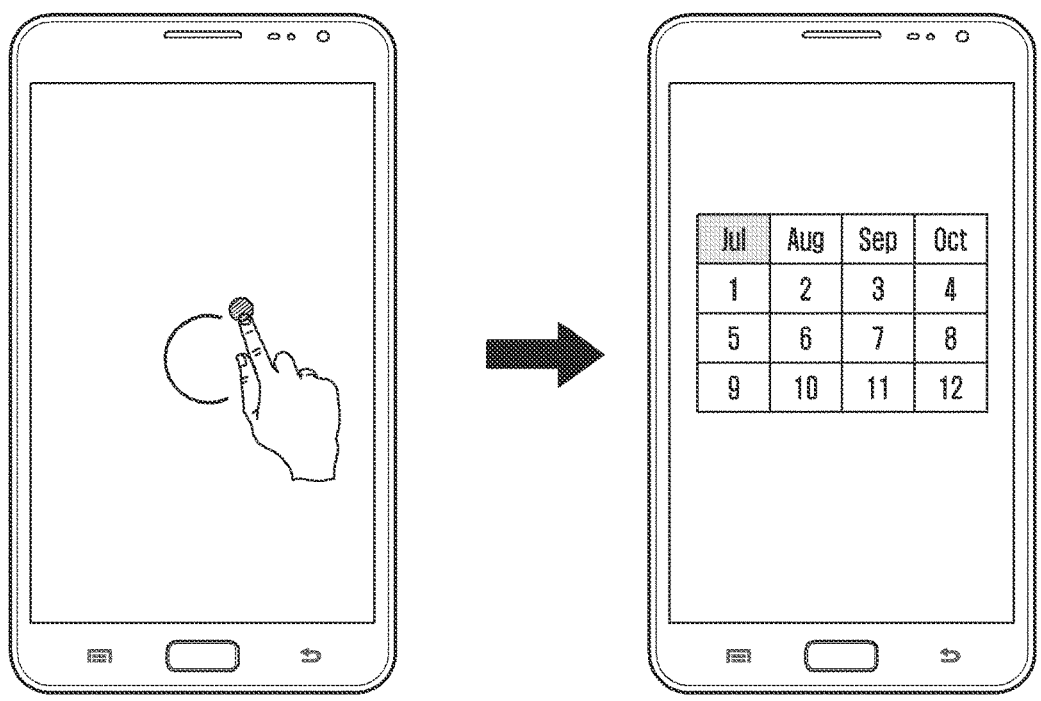

FIGS. 6A and 6B show example illustrations in which the electronic device 100 displays the clock and calendar application using the low power controller based on the gesture performed by the user according to various embodiments of the present disclosure.

Referring to FIG. 6A, when the user performs a circular gesture on the display screen 110 of the electronic device 100, the electronic device 100 displays a clock to the user. In this example, the circular gesture performed by the user is mapped to display clock (as defined or configured by the user), thus the electronic device 100 displays the clock to the user on the display screen 110. If the circular gesture performed by the user is larger in dimensions, then the electronic device 100 displays the clock in larger dimensions. Further, if the circular gesture performed by the user has smaller dimensions, then the electronic device 100 displays a smaller clock to the user. Thus, the electronic device 100 displays the clock to the user in response to the circular gesture based on the dimensions of the gesture performed by the user.

Similarly, referring to FIG. 6B, when the user performs the touch input gesture as alphabet 'C' as shown in FIG. 6B, the electronic device 100 displays a calendar application to the user. In this example, the touch input gesture (alphabet 'C') performed by the user is mapped to display the calendar application (as defined or configured by the user), thus the electronic device 100 displays the calendar application to the user on the display screen 110.

Figure 7:
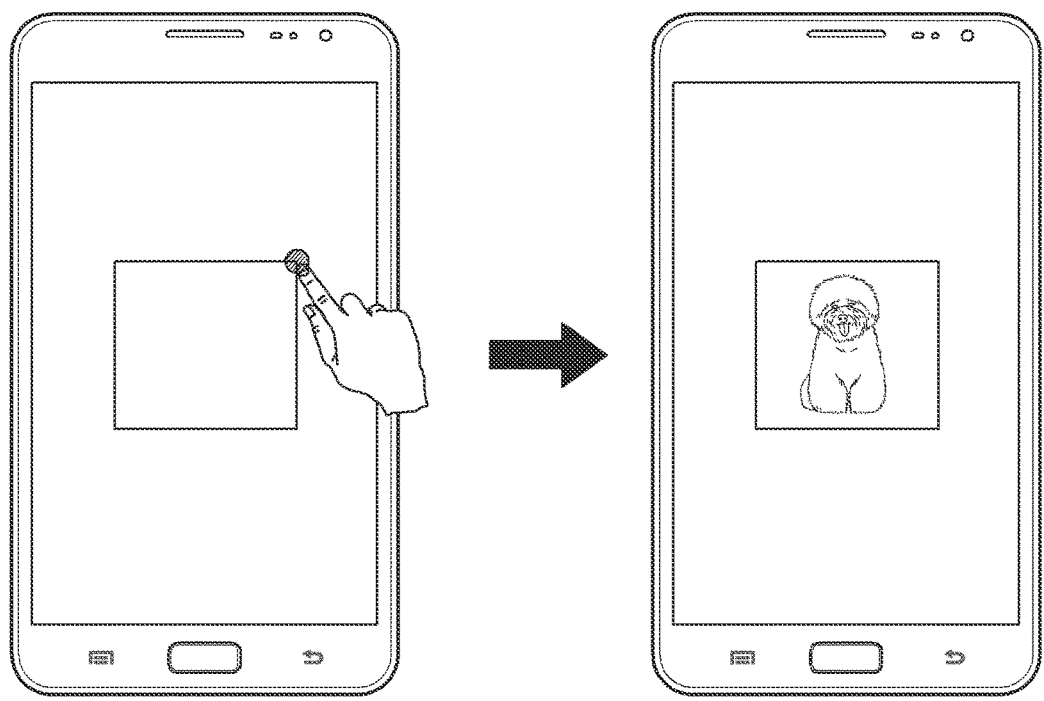
FIG. 7 shows an example illustration in which the electronic device displays an image based on the gesture performed by the user according to an embodiment of the present disclosure.

FIG. 7 shows an example illustration in which the electronic device 100 displays an image to the user based on the gesture performed by the user according to an embodiment of the present disclosure.

Referring to FIG. 7, when the user performs the touch input gesture in the shape of a square, the electronic device 100 displays an image to the user. Initially, the user performs a square shaped gesture and is recognized by the touch panel controller 104. Further, the touch panel controller 104 sends the square shape gesture for processing by the low power controller 106. In an embodiment of the present disclosure, the low power controller 106 square shape gesture and identifies the one or more items corresponding to the touch input 'S' in the memory module 206. The mapping module 202 identifies that the touch input gesture (square shape) is associated with an image. The image corresponding to the square shape gesture is obtained from the memory module 206 of the low power controller 106. Further, the image is displayed on the display screen 110 of the electronic device 100. In this example, the touch input gesture (the square shape) performed by the user is mapped to display the image (as defined or configured by the user), thus the electronic device 100 displays the image application to the user on the display screen 110. In an example, the image is displayed to the user in the small portion on the display screen 110 without completely illuminating the display screen 110. In an embodiment of the present disclosure, the small portion or display screen on which the notifications, the items, or the messages displayed to the user can be configurable as required by the user. The image displayed to the user on the display screen 110 is based on the dimension of the square shape gesture performed by the user. If the dimension of the square shape is large, then the image displayed to the user is large. If the dimension of the square shape is small, then the image displayed to the user is small, thus the image displayed to the user on the display screen 110 depends on the dimension of the square shape gesture performed by the user.

Figure 8:
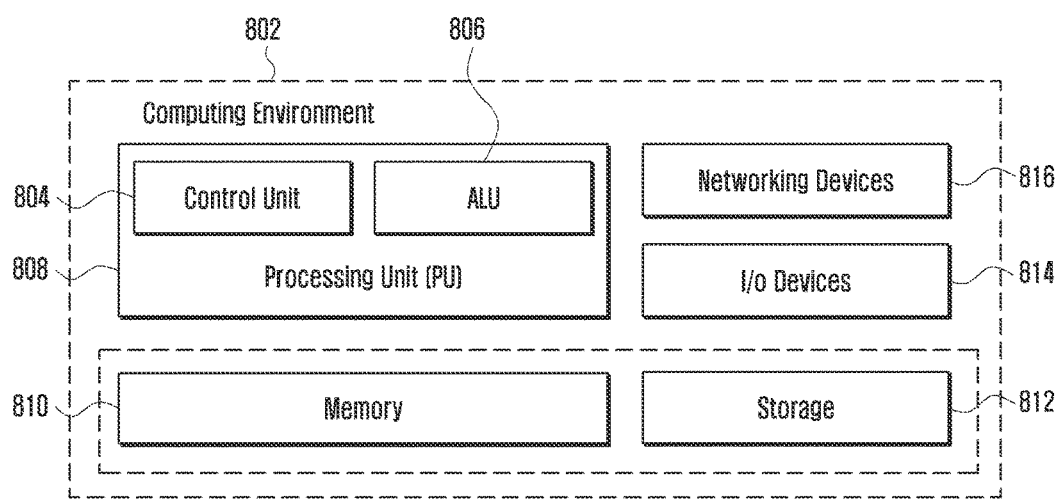
FIG. 8 illustrates a computing environment implementing the method for controlling display of one or more items in an electronic device according to an embodiment of the present disclosure.

FIG. 8 illustrates a computing environment implementing the method according to an embodiment of the present disclosure.

Referring to FIG. 8, the computing environment 802 comprises at least one processing unit 808 that is equipped with a control unit 804 and an arithmetic logic unit (ALU) 806, a memory 810, a storage 812, a plurality of networking devices 816, and a plurality of input/output (I/O) devices 814. The processing unit 808 is responsible for processing the instructions of the algorithm. The processing unit 808 receives commands from the control unit 804 in order to perform its processing. Further, any logical and arithmetic operations involved in the execution of the instructions are computed with the help of the ALU 806.

The overall computing environment 802 can be composed of multiple homogeneous and/or heterogeneous cores, multiple central processing units (CPUs) of different kinds, special media and other accelerators. The processing unit 808 is responsible for processing the instructions of the algorithm. Further, the plurality of processing units 808 may be located on a single chip or over multiple chips.

The algorithm comprising of instructions and codes used for the implementation are stored in either the memory 810, the storage 812, or both. At the time of execution, the instructions may be fetched from the corresponding memory 810 and/or storage 812, and executed by the control unit 804.

In a case of any hardware implementations, various networking devices 816 or external I/O devices 814 may be connected to the computing environment to support the implementation through the networking unit and the I/O device unit.

The various embodiments disclosed herein can be implemented through at least one software program running on at least one hardware device and performing network management functions to control the elements. The elements shown in FIGS. 1A, 1B, 1C, 2, 4, and 8 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling display of at least one item in an electronic device, the method comprising:
while a display screen of the electronic device is in an off state, detecting a touch gesture performed on the display screen using a low power controller in the electronic device without waking up an application processor of the electronic device;
classifying, by the low power controller, at least one item related to at least one application corresponding to the touch gesture, wherein the touch gesture is identified as a predetermined figure;
identifying a position and a size of the touch gesture on the display screen while the electronic device is in the off state; and
in response to the detecting of the touch gesture, controlling to display the at least one item in a portion of the display screen according to the position and the size of the touch gesture, wherein a position and a size of the at least one item being displayed corresponds to the position and the size of the touch gesture applied while the electronic device is in the off state.

2. The method of claim 1, wherein the low power controller controls to display the at least one item in the portion of the display screen without waking the application processor of the electronic device.

3. The method of claim 2, wherein the low power controller receives and stores information about the at least one item from the application processor when the application processor wakes up.

4. The method of claim 1, wherein the controlling, by the low power controller, to display the at least one item comprises:
displaying the at least one item in the portion of the display screen according to at least one of the position and the size of the touch gesture without illuminating the entire display screen.

5. The method of claim 1, wherein the at least one item includes at least one of a notification, message, multimedia, updates from social networking sites (SNS), an item of a clock, or an item of a calendar.

6. The method of claim 1,
wherein the identifying of the position of the touch gesture comprises identifying the position and the size of the touch gesture on the display screen,
wherein the controlling to display the at least one item comprises, in response to the detecting of the touch gesture, controlling to display the at least one item in the portion of the display screen according to the position and the size of the touch gesture, and
wherein the size of the at least one item being displayed corresponds to the size of the touch gesture.

7. An electronic device for controlling display of at least one item, the electronic device comprising:
a display screen;
an application processor; and
a low power controller configured to:
while the display screen is in an off state, detect a touch gesture performed on the display screen without waking up the application processor,
classify at least one item related to at least one application corresponding to the touch gesture, wherein the touch gesture is identified as a predetermined figure,
identify a position and a size of the touch gesture performed on the display screen while the display screen is in the off state, and
in response to the detecting of the touch gesture, control to display the at least one item in a portion of the display screen according to the position and the size of the touch gesture,
wherein a position and a size of the at least one item being displayed corresponds to the position and the size of the touch gesture applied while the electronic device is in the off state.

8. The electronic device of claim 7, wherein the low power controller is further configured to display the at least one item on a predefined shape without waking the application processor.

9. The electronic device of claim 8, wherein the low power controller is further configured to receive and store information about the at least one item from the application processor whenever when the application processor wakes up.

10. The electronic device of claim 7, wherein, when controlling to display the at least one item in the portion of the display screen, the low power controller is further configured to:
display the at least one item in the portion of the display screen according to at least one of the position and the size of the touch gesture without illuminating the entire display screen.

11. The electronic device of claim 7,
wherein the low power controller is further configured to:
identify the position and the size of the touch gesture performed on the display screen, and
in response to detecting the touch gesture, control to display the at least one item in the portion of the display screen according to the position and the size of the touch gesture, and
wherein the size of the at least one item being displayed corresponds to the size of the touch gesture.

12. An electronic device for controlling a display of at least one item, the electronic device comprising:
a display screen; and
at least one processor configured to:
detect a touch gesture performed on the display screen while the electronic device is in an off state,
identify at least one item related to at least one application according to the touch gesture, wherein the touch gesture is identified as a predetermined figure,
identify a position and a size of the touch gesture performed on the display screen while the electronic device is in the off state, and
display the at least one item in a portion of the display screen based on the position and the size of the touch gesture,
wherein a position and a size of the at least one item corresponds to the position and the size of the touch gesture applied while the electronic device is in the off state.

13. The electronic device of claim 12, wherein the at least one processor is further configured to classify the at least one item including at least one of a notification, message, multimedia, updates from Social social networking sites (SNS), a clock, or a calendar according to the touch gesture identified as the predetermined figure.

14. The electronic device of claim 12,
wherein the at least one processor is further configured to:
identify the position and the size of the touch gesture performed on the display screen, and
control to display the at least one item in the portion of the display screen based on the position and the size of the touch gesture, and
wherein the size of the at least one item being displayed corresponds to the size of the touch gesture.

15. An electronic device for controlling display of at least one item, the electronic device comprising:
a display screen; and
at least one processor configured to:
detect a touch gesture performed on the display screen while the display screen is in an off state,
classify at least one item related to at least one application corresponding to the touch gesture, wherein the touch gesture is identified as a predetermined figure,
identify a size and a position of the touch gesture performed on the display screen while the display screen is in the off state, and in response to detecting the touch gesture, control to display the at least one item in a portion of the display screen according to the size and the position of the touch gesture,
wherein a size and a position of the at least one item being displayed corresponds to the size and the position of the touch gesture applied while the display screen is in the off state.

* * * * *